3,279,946
HYDROGEN CHLORIDE TREATMENT OF SEMICONDUCTOR COATING CHAMBER
Edward C. Schaarschmidt, Cranford, N.J., assignor to Merck & Co., Inc., Rahway, N.J., a corporation of New Jersey
No Drawing. Filed Aug. 14, 1962, Ser. No. 216,765
5 Claims. (Cl. 117—201)

This invention relates to a process for preparing high resistivity semiconductor materials and, more particularly, it is concerned with the production of high resistivity n-type semiconductor materials by a process of removing adsorbed donors from within a reactor system.

The process of preparing semiconductor material by depositing from the vapor phase is well known in the art. Such a process includes providing a reactor chamber in which is positioned a semiconductor support member and then admitting into the chamber a decomposable semiconductor compound together with a carrier gas. However, this technique suffers the disadvantage that the resistivity of semiconductor material thus deposited is limited in the high resistivity range. One particular difficulty has been the production of high resistivity n-type semiconductor layers. Accordingly, it has been the object of considerable research to provide a technique for obtaining high resistivity n-type semiconductor materials by deposition of the vapor phase.

What is described herein is a process step by which high resistivity n-type semiconductor layers may be prepared by deposition from the vapor phase. By this method, n-type semiconductor layers having a resistivity as high as 50 ohm-cm. are prepared.

The method of the present invention is based upon preconditioning the reactor chamber so that at the beginning of the deposition there is substantially an absence of resistivity-limiting impurities in the reactor. In particular, the method step involves heating the reactor chamber to within 450°–1000° C. in the presence of a reactant gas which will react with donor impurities adsorbed on the walls of the chamber. In the preferred form of the present invention the reactant gas is HCl, although chlorine may be used as well. The reacting gases are admitted in a carrier stream of argon or hydrogen.

*Example*

In a typical run, a quartz reactor bell is cleaned with chemical reagents and positioned within a vapor deposition apparatus, such as one described in United States Patents Nos. 3,011,877, 3,042,494, and the like. The reactor then is heated at 600° C. while a stream of 1 l./min. of HCl in 4 l./min. of hydrogen is admitted. In operation the HCl reacts with the adsorbed donor impurities on the walls of the tube to produce a volatile form thereof which is then removed from the reactor. The thus-treated reactor is then ready for deposition of semiconductor material from the vapor phase in the usual manner. For example, using 1.3 g./min. of $SiHCl_3$ as the deposition material in 20 l./min. of $H_2$ there is obtained a deposit having a resistivity of 42 ohm-cm.

While the invention has been described with particular reference to certain embodiments thereof, it will be readily understood by those skilled in the art that various substitutions may be made without departing from the spirit and scope of the invention.

What is claimed is:
1. In a vapor deposition process for preparing high resistivity n-type semiconductor materials from the vapor phase within a reactor chamber, the step of preconditioning said reactor chamber by heating the chamber walls within the temperature range of 450–1000° C. in the presence of a stream of a reactant gas of hydrogen chloride.
2. The step in accordance with claim 1 wherein the reactant gas is chlorine in a carrier stream of hydrogen.
3. The step in accordance with claim 1 wherein said reactor temperature is 600° C.
4. The claim in accordance with claim 1 wherein said reactant gas is HCl in a carrier stream of hydrogen.
5. In a vapor deposition process for preparing high resistivity n-type semiconductor materials from the vapor phase within a reactor chamber, the step of preconditioning said reactor chamber by heating the chamber walls at 600° C. in the presence of a reactant gas stream of 1 l./min. of HCl in 4 l./min. of hydrogen.

References Cited by the Examiner

UNITED STATES PATENTS

| | | | |
|---|---|---|---|
| 2,880,117 | 3/1959 | Hanlet | 117—106 |
| 3,171,755 | 3/1965 | Reuschel et al. | 117—54 X |

FOREIGN PATENTS

| | | |
|---|---|---|
| 576,325 | 5/1959 | Canada. |

ALFRED L. LEAVITT, *Primary Examiner.*

RICHARD D. NEVIUS, *Examiner.*

W. L. JARVIS, A. GOLIAN, *Assistant Examiners.*